United States Patent
Kozdon et al.

(12) 
(10) Patent No.: US 6,240,070 B1
(45) Date of Patent: May 29, 2001

(54) SYSTEM AND METHOD FOR IMPROVING AUDIO QUALITY ON A CONFERENCING NETWORK

(75) Inventors: Peter Kozdon, Santa Clara, CA (US); Eli Jacobi, Tel Aviv (IL); William J. Beyda, Cupertino, CA (US)

(73) Assignee: Siemens Information and Communication Networks, Inc., Santa Clara, CA (US)

( * ) Notice: Subject to any disclaimer, the term of this patent is extended or adjusted under 35 U.S.C. 154(b) by 0 days.

(21) Appl. No.: 09/169,639

(22) Filed: Oct. 9, 1998

(51) Int. Cl.[7] .................................................. H04M 3/56
(52) U.S. Cl. ............................................. 370/260; 704/500
(58) Field of Search ........................... 709/204; 704/500; 370/260

(56) References Cited

U.S. PATENT DOCUMENTS

| | | | |
|---|---|---|---|
| 5,383,184 | 1/1995 | Champion | 370/267 |
| 5,434,913 | 7/1995 | Tung et al. | 379/202 |
| 5,570,363 | 10/1996 | Holm | 370/260 |
| 5,983,192 | * 11/1999 | Botzko et al. | 704/500 |
| 6,064,653 | * 5/2000 | Farris | 370/237 |
| 6,070,089 | * 5/2000 | Brophy et al. | 455/560 |

* cited by examiner

*Primary Examiner*—Kenneth R. Coulter (57) ABSTRACT

A conferencing system (100) improves audio quality by identifying and selectively allowing a dominant audio channel to bypass a lossy compression transformation included in a server 102. The system (100) places conference calls over a network (106) and includes the conference server (102), having an input interface (200), a decompressor (202), a summation circuit (212), a correlation unit (206) a compressor (214), and an output interface (220). The input interface (200) receives a plurality of audio channels, each being compressed using a lossy compression algorithm. The decompressor (202) decompresses each of the incoming channels to produce a plurality of decompressed audio channels, which are then summed by the summation circuit (212) to produce a summation stream. The compressor (214) compresses the summation stream to produce a first audio output. The correlation unit (206) identifies a dominant channel from the incoming compressed audio channels. The dominant channel bypasses decompressor (202) and compressor (214) to be directly output as a second audio channel. The first and second output channels are then transmitted over the network (106) to a plurality of clients (103–105). The clients (103–105) present both channels of audio data to conference participants. Overall audio quality is improved because the dominant channel bypasses successive decompression/compression steps.

16 Claims, 7 Drawing Sheets

SYSTEM AND METHOD FOR IMPROVING AUDIO QUALITY ON A CONFERENCING NETWORK

BACKGROUND OF THE INVENTION

1. Field of the Invention

The present invention generally relates to teleconferencing, and in particular, to a system and method that improves audio quality by compensating for lossy audio compression algorithms used in conventional conferencing networks.

2. Description of the Related Art

Figure 1:
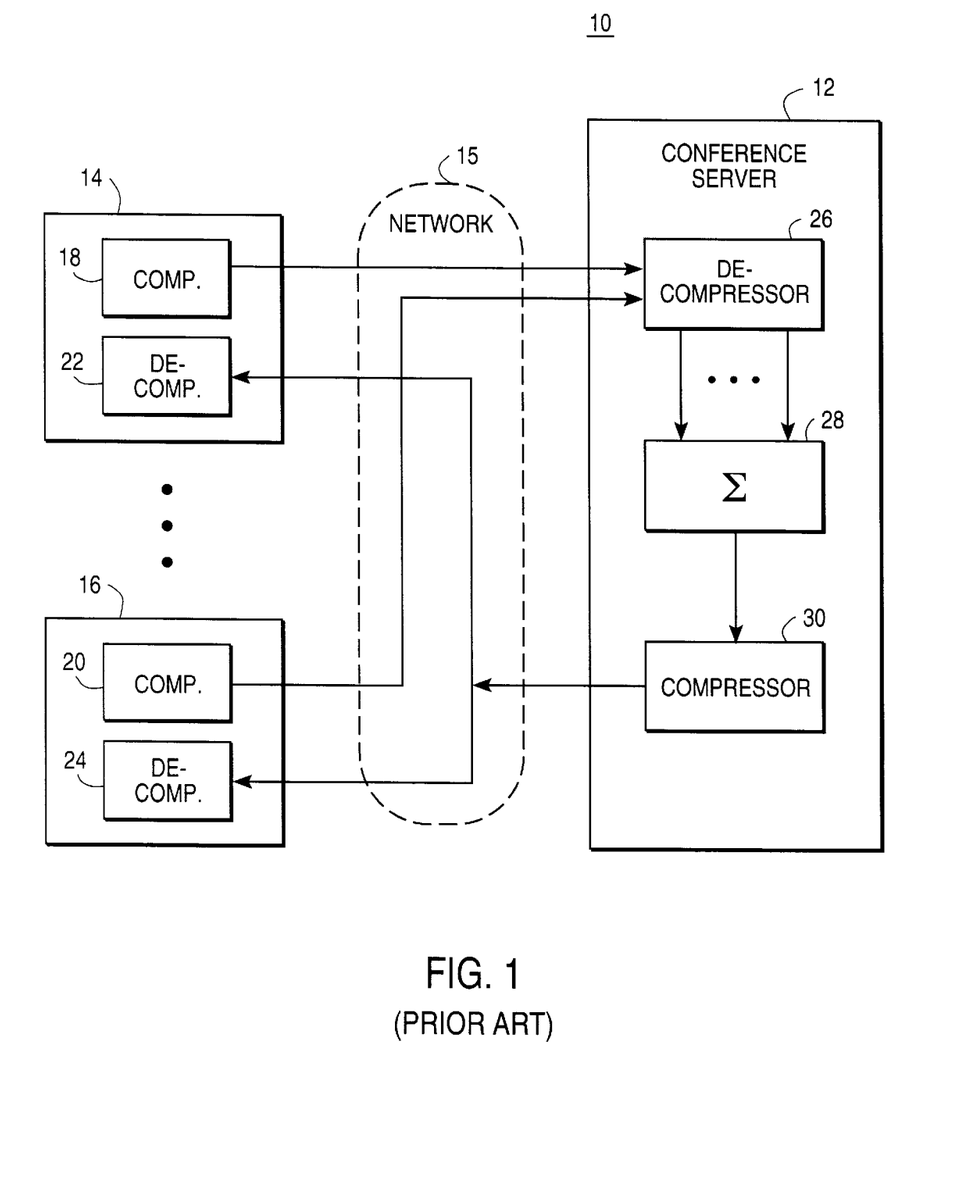
FIG. 1 is a block diagram illustrating a prior art conferencing system.

Computer-based conferencing has become popular as a means for carrying out a meeting between remotely located participants. As shown in FIG. 1, a conventional conferencing network 10 typically includes a plurality of clients 14–16 connected to a conference server 12 via a communications network 15. The server 12 permits the clients 14–16 to simultaneously communicate with one another, effectively emulating a conference room filled with participants.

Although many computer-based conferencing systems permit transfer of video, voice, and data, the system 10 shown in FIG. 1 illustrates only the audio portion of the conferencing system. In the system 10, the clients 14–16 can be any device permitting a user to transmit and receive compressed audio data, such as a personal computer (PC), a video phone, a telephone featuring audio compression, or the like. Each of the clients 14–16 includes an audio compression algorithm 18–20 and a corresponding decompression algorithm 22–24. When a participant speaks, his/her utterances are converted to digital information by the respective clients 14–16. This digital information is then compressed by the compression algorithms 18–20 and transferred over the network 15 to the conference server 12.

To maintain a fully duplexed audio channel, the conference server 12 separately decompresses each of the compressed audio streams received from the clients 14–16 using the decompressor 26. The decompressed audio channels are then summed by a summation circuit 28. The output of the summation circuit is then compressed by a compressor 30. Representing the fully duplexed channel, the compressed summation stream is then transmitted back to each of the clients 14–16 over the network 15. Each of the clients 14–16 includes a decompression algorithm 22–24 which decompresses the audio information carried in the common channel.

In recent years, there has been major progress in the development of compression algorithms. This represents a real economic benefit, since compressed voice takes much less bandwidth than uncompressed voice and many conversations can be multiplexed over the same channel. However, compression algorithms such as GSM, True Speech™, G.723.1, etc., are lossy and hence, pose a problem for features like conference calling. Using lossy algorithms results in data loss, and consequently introduces distortism every time the audio is compressed. This problem becomes more compounded in hierarchical networks, where summation streams from various servers are successively combined using lossy compression algorithms. Every round of compression/decompression results in a poorer voice quality.

Alternatively, lossless compression algorithms can be used to overcome the problems caused by repeated transformations. However, lossless algorithms have lower compression ratios than lossy algorithms and therefore consume much more bandwidth. In addition, lossy compression is essential in narrow band communication systems, such as systems using H.324.

Therefore, there is a need for an improved conferencing system that does not rely on lossless audio algorithms and compensates for degraded audio quality caused by lossy compression transformations.

SUMMARY OF THE INVENTION

It is an advantage of the present invention to provide an improved conferencing system and method that reduces the negative effect of lossy algorithms on audio quality.

In accordance with one embodiment of the present invention, there is provided a system that includes an improved conference server. Audio quality is improved by selectively allowing a dominant input channel to bypass a lossy compression transform performed by the server.

The conference server includes an input interface that receives compressed audio channels from a plurality of clients using lossy compression. Coupled to the interface is a decompressor, which decompresses the incoming audio channels to produce corresponding decompressed audio channels. A summation circuit sums the decompressed audio channels to produce a summation stream. The summation stream is then recompressed and provided as a first output of the server.

A selection unit included in the server selects a dominant channel from among the incoming compressed audio channels. The audio information carried in the dominant channel is then directly provided as a second output of the server, bypassing the decompression/compression round which normally takes place in a conventional server. By allowing one or more incoming audio channels to selectively bypass the lossy transformation of the server, the overall quality of audio presented at the clients can be improved. Thus, the audio information of the second output leaves the server having a significantly higher audio quality.

At each client, various mixing options are available to the user. For instance, the compressed dominant channel of the second output can be combined with the compressed summation stream of the first output to produce overall higher quality conference audio.

BRIEF DESCRIPTION OF THE DRAWINGS

A better understanding of the present invention when the following detailed description is considered in conjunction with the following drawings in which.

DETAILED DESCRIPTION OF THE INVENTION

Figure 2:
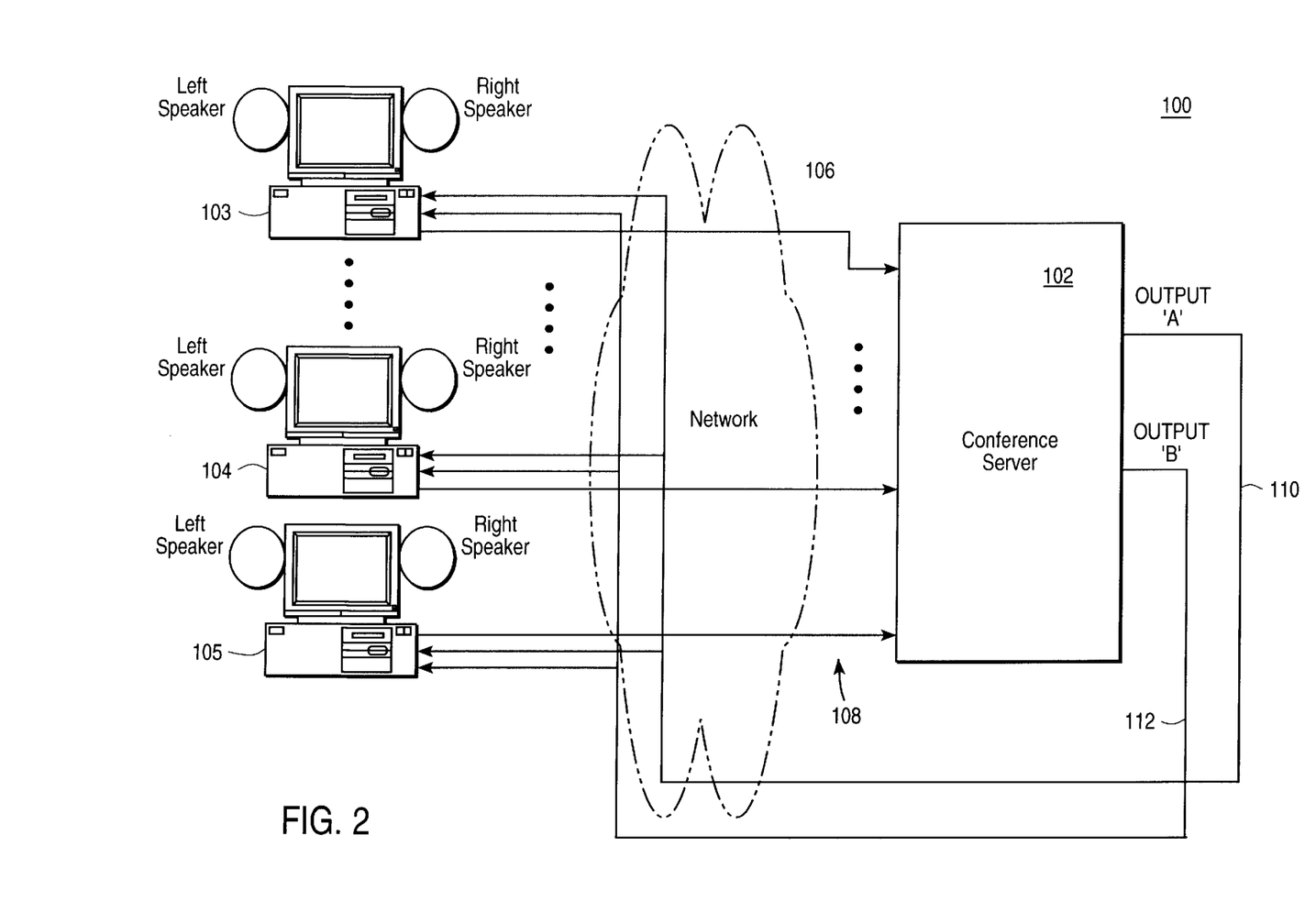
FIG. 2 illustrates a conferencing system in accordance with one embodiment of the present invention.

Turning now to the drawings, and in particular to FIG. 2, there is illustrated an exemplary conferencing system 100 that includes a conference server 102 coupled to a plurality of clients 103–105 using a communications network 106. In accordance with one embodiment of the present invention, the conference server 102 receives a plurality of compressed audio channels 108 from the clients 103–105. The clients 103–105 rely on one or more known lossy compression algorithms, such as GSM True Speech, G.723.1, or the like, to produce the compressed audio streams 108. In response to the incoming compressed audio channels, the conference server generates an output 'A' 110 and an output 'B' 112. The output 'A' 110 represents a compressed summation stream, while the output 'B' 112 represents compressed audio information from the dominant incoming audio channel. The summation stream can be produced by combining each of the incoming audio channels into a single output channel. The dominant channel can represent a single incoming audio channel that has been selected from among the incoming audio channels.

The outputs 'A'–'B' 110–112 are transferred to each of the clients 103–105 over the network 106. The outputs 110–112 can be transmitted as two virtual data streams on a single logical circuit.

The network 106 can be any conventional data network suitable for transmitting digitized audio information, such as a packet switched network using a TCP/IP protocol, e.g., an Ethernet or Token Ring local area network (LAN), Internet, or the like. The server 102 and clients 103–105 can be coupled to the network using conventional interface devices, such as network adaptor cards.

At each client 103–105, the audio information generated by the conference server 102 is presented in a coherent, real-time manner. The compressed audio streams provided by outputs 'A'–'B' 110–112 are first decompressed by each client 103–105. The decompressed audio is then either recombined and presented to the user as a single audio channel, or is simultaneously presented on separate channels. As an example of the later alternative, in clients having stereo speakers, the summation stream can be played on the left speaker channel, while the dominant channel can be played on the right speaker channel of the client. A client having multi-channel output can be implemented using a conventional multimedia PC having a commercially available sound card that supports left and right speaker channels.

Figure 3:
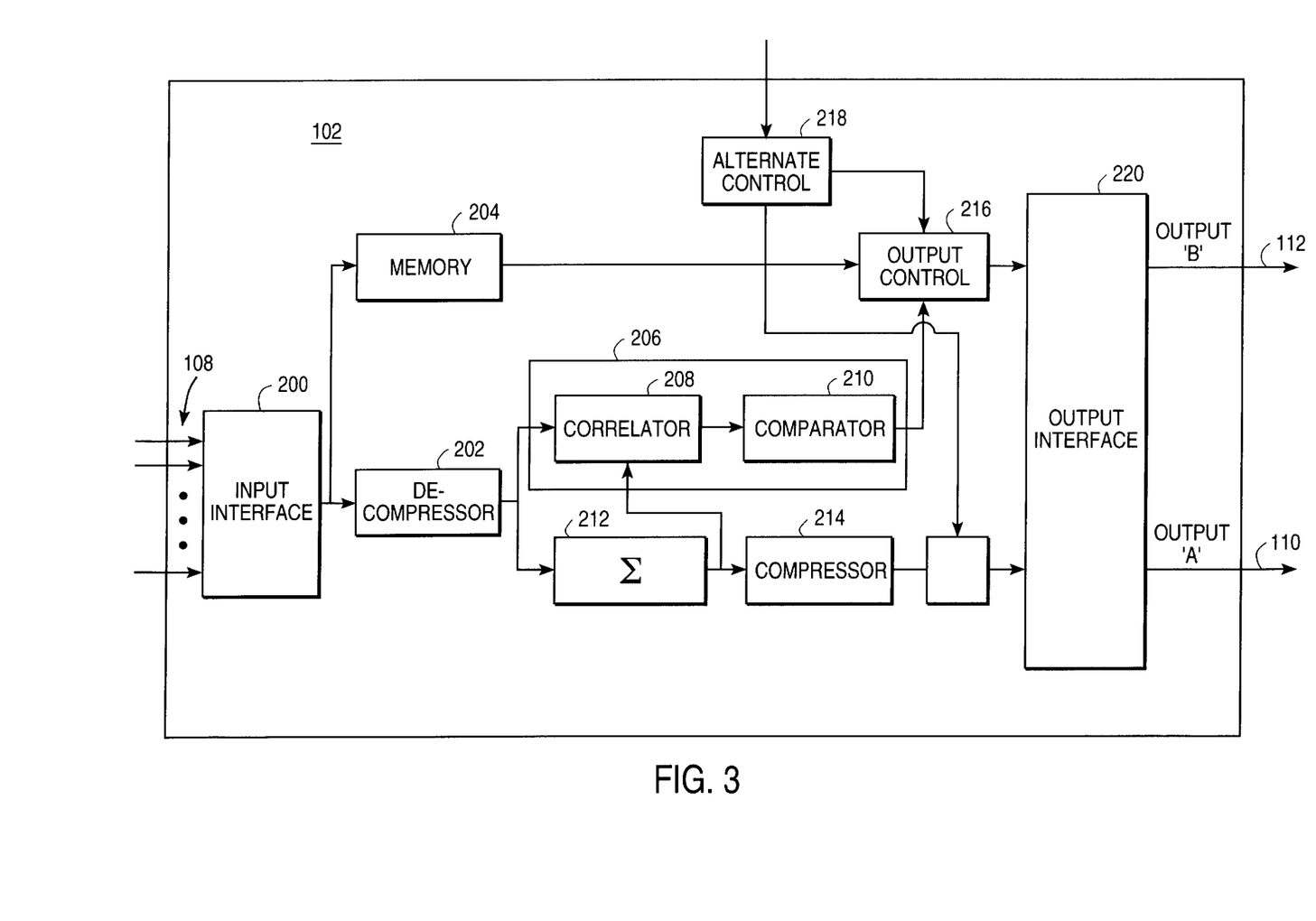
FIG. 3 is a block diagram illustrating details of the conference server shown in FIG. 2.

FIG. 3 illustrates a detailed block diagram of an exemplary system that can be used as the conference server 102. The conference server 102 includes an input interface 200, one or more decompressors 202, one or more memories 204 for storing incoming audio information, a correlation unit 206, a summation circuit 212, a compressor 214, an output control 216, an alternative control 218, and an output interface 220.

The conference server 102 can be implemented by a computer executing software programs, such as a personal computer (PC) running a commercially-available operation system (OS), such as Windows™ NT or 98, provided by Microsoft Corporation. In conjunction with the OS, a unique software program can implement the functions of at least the elements 202–216 of the server 102. The input and output interfaces 200, 210 can be conventional network cards adapted to interface with a conventional PC and OS, such as an Ethernet card. Alternatively, the server 102 can be equivalently implemented using custom digital hardware that includes micro chips, such as application specific integrated circuits (ASICs) or digital signal processors (DSPs) specifically designed to perform server functions as described herein.

Compressed audio channels 108 from the clients are received by the input interface 200. The input interface 200 can be any conventional network interface card that permits the clients 103–105 to concurrently communicate with the server 102 over the data network 106 in real-time. The input interface 200 provides each of the audio channels to a corresponding decompressor 200 and memory 204. Each memory 204 temporarily stores segments of an audio channel to compensate for processing latency within the server 102. The decompressors 202 decompress each of the incoming audio channels. The decompressed audio streams are then provided to the correlation unit 206 and the summation circuit 212. The summation circuit 212 sums the decompressed audio from all of the channels to produce a summation stream. The summation circuit 212 can be an adder and register in a standard microprocessor, configured to perform an accumulation function. Prior to being summed, the decompressed audio streams can be linearized. The summation stream is then compressed by compressor 214. The compressor 214 then provides the compressed summation stream to the output interface 220.

The decompressor 202 and compressor 214 execute a conventional lossy compression algorithm. The algorithm can be based on any lossy algorithm, including commercially-available conventional audio compression algorithms executable in software running on a personal computer such as GSM, True Speech, G723.1, or the like. Each of the clients 103–105 can likewise include an audio compression algorithm corresponding to that used by the server 102. The compressors 214, 316 and decompressors 202, 302 can be commercially-available software routines executable on a PC using a standard OS, such as Windows™ NT or 98.

The correlation unit 206 identifies a dominant channel from among the incoming audio channels. The incoming compressed audio stream contained in the dominant channel bypasses the data flow through the decompressors 202 and compressor 214, and is instead provided directly to the output interface 220 via memory 204 and output control 216.

The correlation unit 206 includes a plurality of correlators 208 and a comparator 210. The correlators 208 correlate each of the decompressed audio channels to the uncompressed summation stream to yield a correlation value for each channel. The correlation values for the channels are compared to one another by the comparator 210 to determine which channel is most highly correlated to the summation stream. The most highly correlated audio channel is then selected as the dominant channel. The identity of the selected channel is then provided to the output control 216, which retrieves the audio segment representing the dominant channel from one of the memories 204 and provides such segment to the output interface 220.

The correlation unit 206 can operate in a continuous real-time manner, permitting the dominant channel to be selected based on the correlation of each of the incoming audio channels. A time average correlation can be used.

Figure 7:
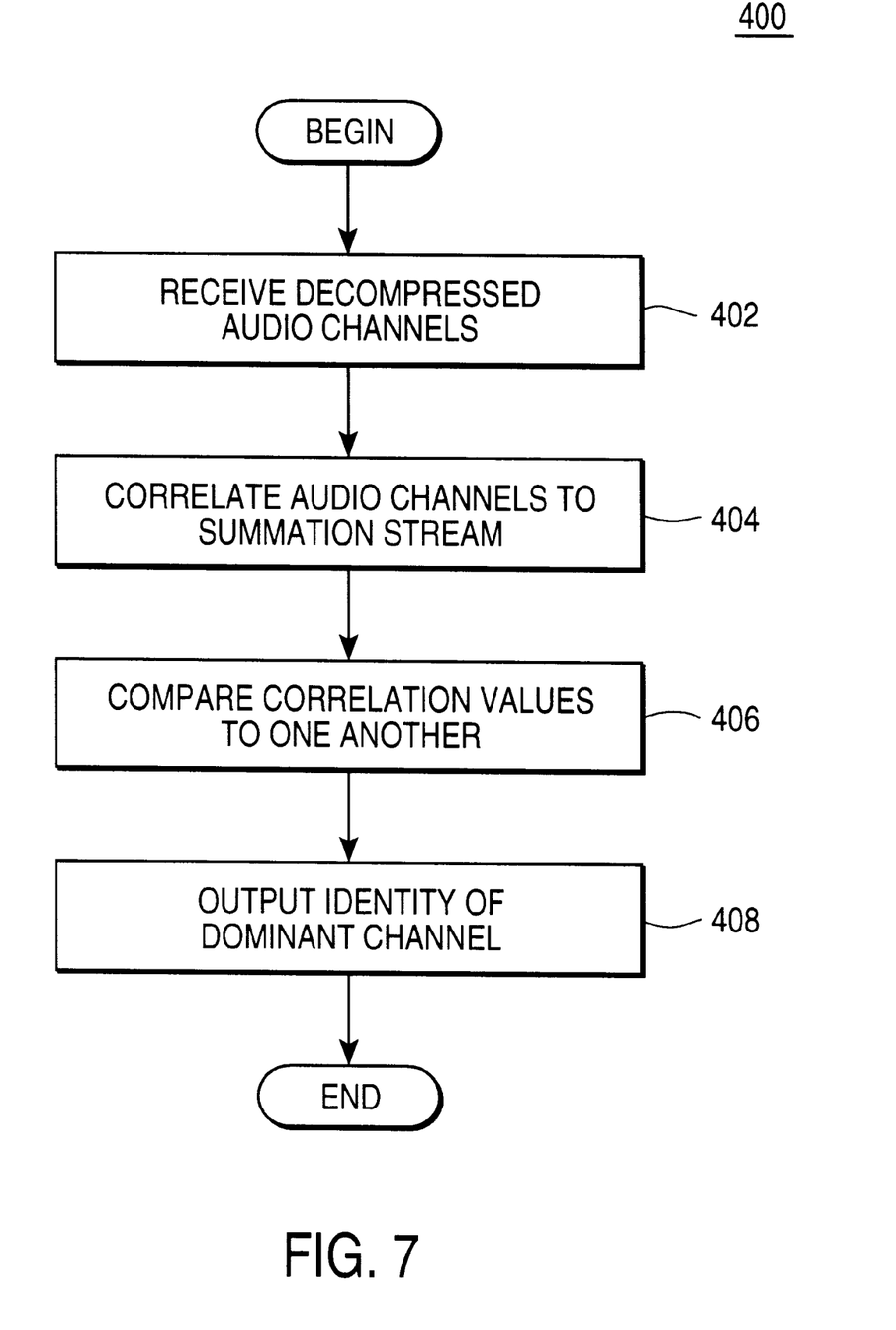
FIG. 7 is a flowchart diagram illustrating operation of the correlation unit shown in FIG. 3.

The correlation unit 206 can be implemented by a software program which is executable on a conventional PC. FIG. 7 shows a flowchart 400 of the steps included in such a software program. In step 402, a plurality of digital words representing decompressed audio is received from the decompressor 202. Each of the digital words represents an audio sample from a respective audio channel. In step 404, each digital word is correlated, in turn, to a corresponding digital value representing a sample from summation stream output from the summation circuit 212. This step produces a plurality of correlation values. Next, in step 406, the correlation values are compared to one another to determine which is the largest. The largest correlation value indicates the dominant channel. In step 408, the identity of the dominant channel is provided to the output control 216.

According to the second way of selecting, the alternative control 218 permits the dominant channel to be preselected. The preselection can be done manually at the server 102 by setting either a hardware or software switch. For instance, where the server is implemented using a PC, the hardware switch can be provided by or more electrical switches coupled to a communications port on the PC. Software on the PC can continuously poll the port to determine whether a switch has been set. When a switch is set, the polling routine can alert the output control 216, which can also be implemented as a software routine.

A software switch can be implemented using a graphical user interface (GUI) provided with the PC operating system, such as that provided with Windows™ NT or 98. In such an implementation, the alternative control 218 can include a software routine for displaying a control panel using the resources of the PC operating system. The control panel can include graphical buttons or switches that can be set by a user with a mouse. When the user has finished setting the switches, the alterative control 218 can transfer the setting information to the output control 216.

In addition, the alternative control 218 can selectively suppress the output of the dominant channel information or the output of the compressed summation stream. This feature is particularly useful in situations where the network 106 is experiencing heavy traffic and cannot easily support the extra bandwidth required by the dominant channel. Accordingly, the alternative control 218 can receive information regarding network traffic loads and can compare the level of traffic to a preset threshold level. If the traffic level exceeds the preset threshold, the alternative control 218 can cause the output control 216 to halt the transmission of the dominant channel audio information to the output interface 220. In a PC implementation, network traffic levels can be determined by providing a software routine in the alternative control 218 that can monitor data transfers at the interfaces 200, 220. For example, with a packet-based network, the rate of packet transfers at each interface 200, 220 could be monitored and compared to predetermined threshold values.

The output interface 220 provides the compressed summation stream as the first output 'A' 110 and the dominant channel as the second output 'B' 112. The output interface can be any conventional network interface that permits the two channels to be simultaneously communicated over the network 106 to the clients 103–105.

Figure 4:
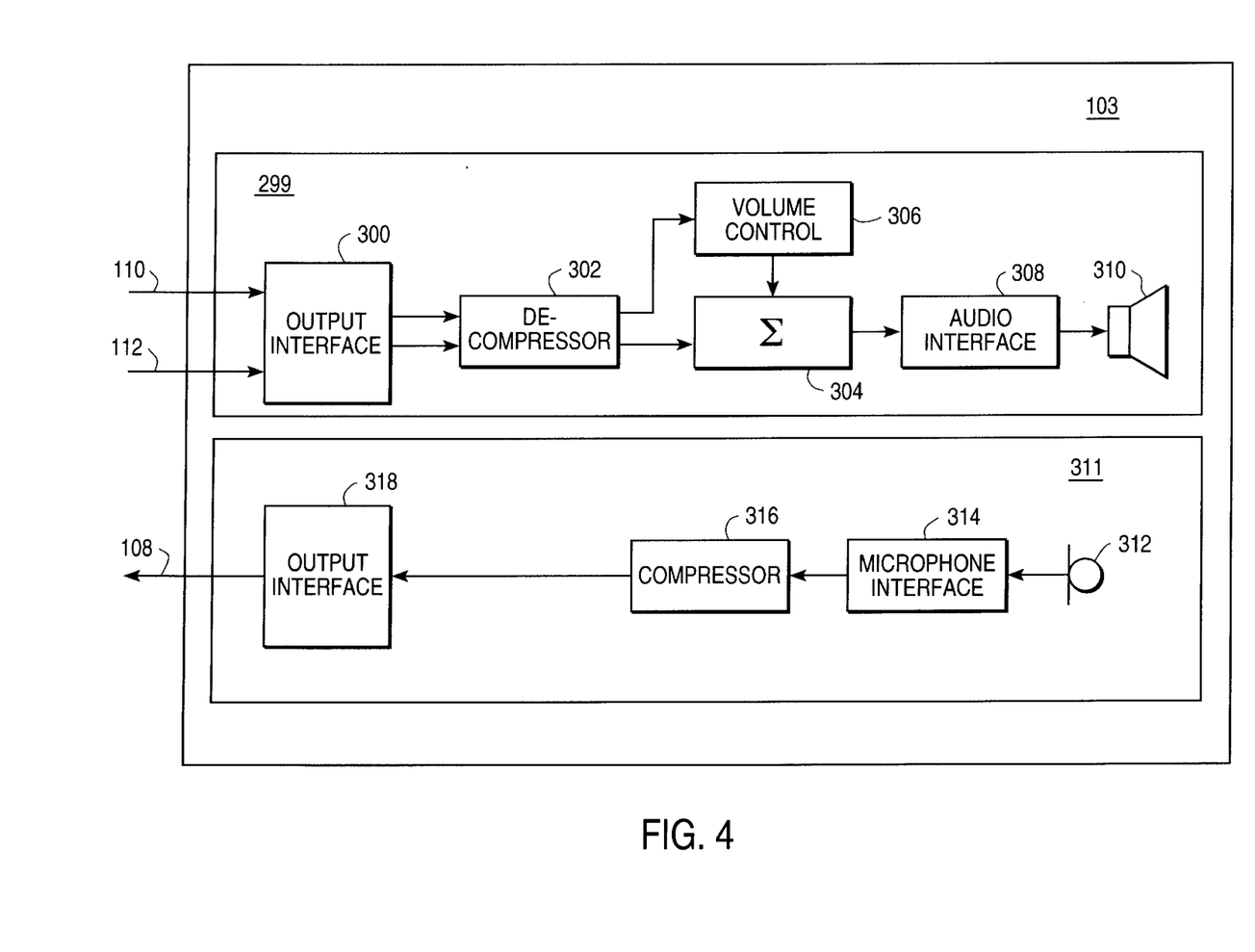
FIG. 4 is a detailed block diagram of one of the clients shown in FIG. 2.

FIG. 4 is a detailed block diagram illustrating an example of one of the clients 103 shown in FIG. 2. The exemplary client 103 includes an input interface 300 configured to receive the compressed summation stream 110 and the dominant channel 112 from the conference server 102. The input interface 300 transfers incoming information to a decompressor 302, which, in turn, decompresses the channels using an audio decompression algorithm corresponding to the compression algorithm used by the server 102. The decompressed channels can be provided to a conventional sound card mixer 304. The sound card mixer 304 permits a user to manually vary volume of one of the incoming channels. For example, the miser 304 can permit a user to manually set the relative volume of the dominant channel by multiplying the decompressed dominant channel information by a factor that is set by the user. The product of the dominant channel and multiplying factor is then added to the decompressed summation stream to generate a conference stream. The mixer card 304 can include circuitry for converting digital audio information into electronic signals that can be used to drive a conventional loudspeaker 310.

The client 103 also includes a transmitter 311 for generating compressed audio output channel 108. The transmitter 311 includes a conventional microphone 312, a microphone interface 314, a compressor 316, and an output interface 318. The microphone interface 314 can be a conventional circuit for converting signals from the microphone into digital audio signals. The compressor 316 executes a conventional lossy audio compression algorithm to generate a compressed audio channel. The compressed audio channel is then passed to the output interface 318. The output interface 318 can be a commercially available conventional network interface that permits the client 103 to communicate with the server 102 over the data network 106.

The client 103 can be assembled using a computer executing software programs, such as a PC running a commercially-available OS, e.g., Windows NT™ or 98, in conjunction with a unique software program implementing and controlling the functions of the client 103. For example, the input and output interfaces 300, 318 can be implemented using a conventional network adapter card and software drivers; while the sound card mixer 304 and microphone interface 314 can be implemented using a conventional multi-media or sound card and its accompanying software drivers. The unique software program mentioned above can control the interfaces 300, 310, 312 and 318 through the OS. In addition, the unique software can implement the functions of elements 302–304, 316. Control of the sound card mixer 304 can be implemented in either hardware as a manually-adjustable knob or button in the software using a GUI control panel. A software routine, similar to that described earlier for the alternative control 218, can be included in the sound card mixer 304 to effect PC port polling or GUI control panel presentation for either the hardware or software user interface, respectively.

Figure 5:
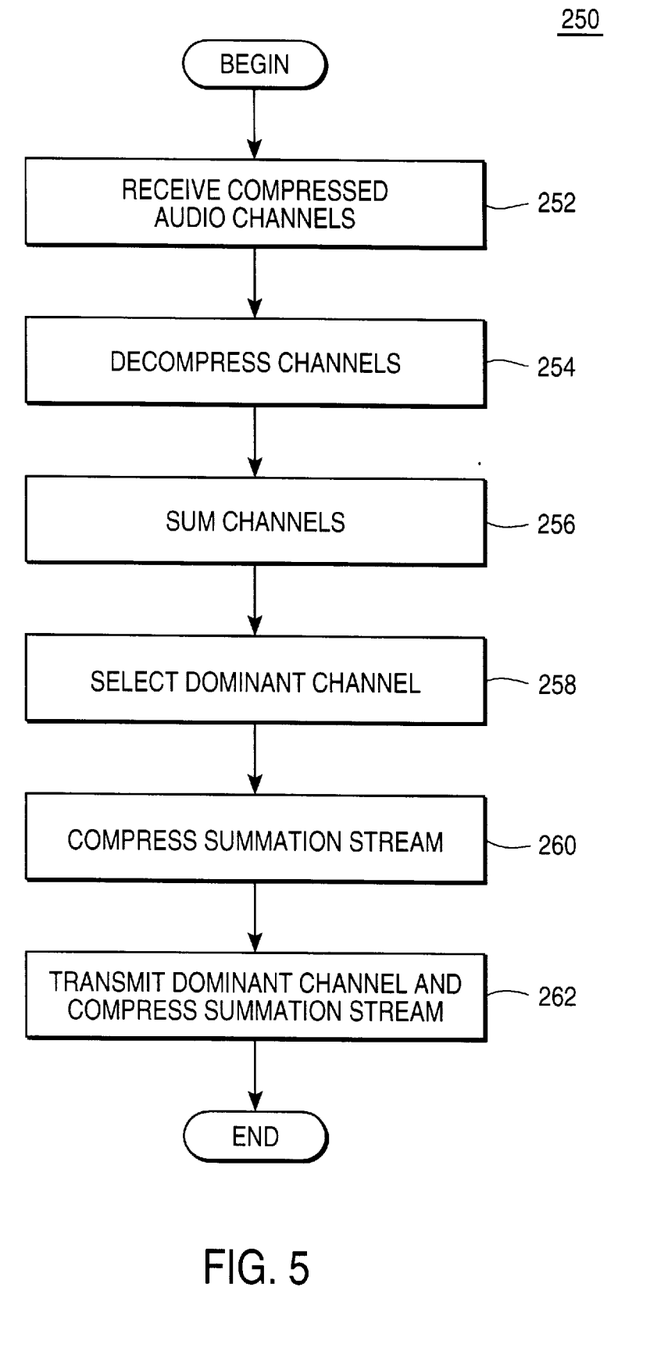
FIG. 5 is a flowchart diagram illustrating operation of the server shown in FIGS. 2-3 in accordance with another embodiment of the present invention.

FIG. 5 shows a flowchart of a method 250 of improving audio quality in a computer-based conferencing system. The method 250 can be executed by software included in the server 102. In step 252, a plurality of compressed audio channels are received by the conference server 102. Information contained in the channels can be compressed according to a conventional lossy audio compression algorithm, such as one of those discussed earlier in reference to FIG. 3. In step 254, the compressed audio channels are individually decompressed to produce a plurality of decompressed audio streams. Next, in step 256, the decompressed audio streams are summed to produce summation stream representing the combination of all the audio channels. In step 258, a dominant channel is selected. The dominant channel can be selected by comparing each of the decompressed streams to the summation stream, or alternatively, by manually selection, as described earlier. The dominant audio channel can represent the best time-correlated channel of audio information. Alternatively, the dominant channel can be externally preselected so that a desired single speaker can address all of the clients attached to the server 102.

In step 260, the summation stream is compressed. Then, in step 262 the dominant channel and the compressed summation stream are then transferred to the clients for presentation to participants in the conference call.

Figure 6:
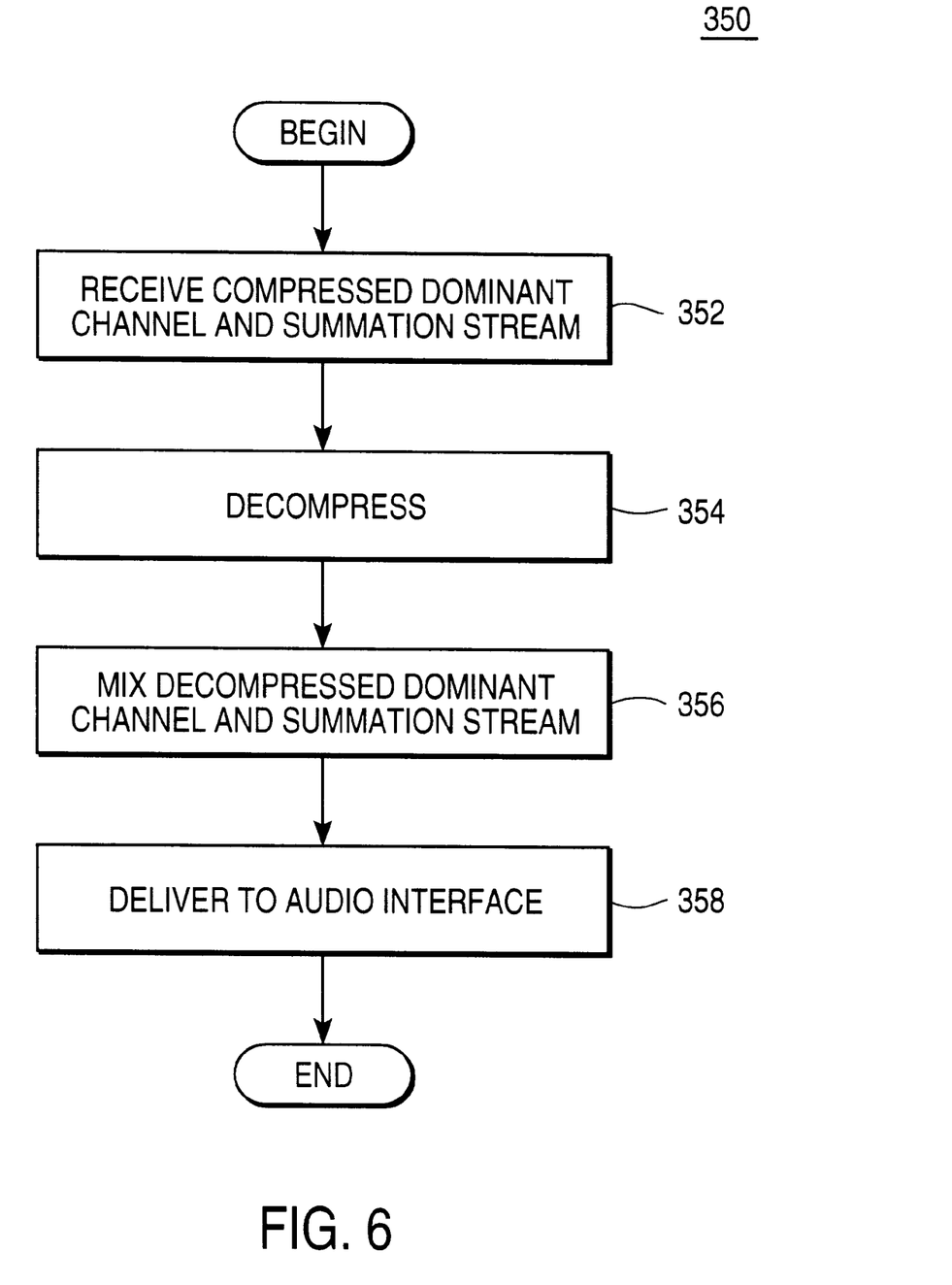
FIG. 6 is a flowchart diagram illustrating operation of one of the clients shown in FIG. 2.

FIG. 6 is a flowchart illustrating a method 350 exemplifying the operation of the receiver 299 included in one of the clients 103–105. In step 352, the compressed summation stream 110 and compressed dominant channel 112 are received by the input interface 300. Next, in step 354 the two input streams are decompressed to respectively produce the decompressed summation stream and decompressed dominant channel. Next, in step 356 the decompressed dominant channel and summation stream are mixed to produce a conference audio stream. The conference stream is then provided to the sound card mixer 304 for presentation to the user via an audio output device, such as the loudspeaker 310 (step 358).

What is claimed is:

1. A system for improving audio quality of conference calls placed over a network using lossy audio compression, comprising:
    means for receiving a plurality of compressed audio channels, each of the audio channels being compressed using a lossy compression algorithm;
    means for performing a decompression/compression transformation on the compressed audio channels to produce a compressed summation stream;
    means for selectively enabling one of the compressed audio channels to bypass the decompression/compression transformation means;
    wherein the decompression/compression transformation means includes:
        means for decompressing the compressed audio channels to produce a plurality of decompressed audio channels;
        means for summing the decompressed audio channels to produce the summation stream, said summing means including means for correlating each of the decompressed audio channels to the summation stream and determining the dominant channel based on comparing a plurality of correlation values derived from the decompressed audio channels; and
        means for compressing the summation stream to produce the compressed summation stream.

2. The system of claim 1, further comprising means for transferring the dominant channel and the compressed summation stream over the network.

3. The system of claim 2, further comprising means for receiving the dominant channel and compressed summation stream transferred over the network.

4. The system of claim 1, further comprising;
    means for suppressing transfer of the dominant channel based on traffic flow across the network.

5. The system of claim 4, further comprising:
    means for configuring a threshold level of traffic flow across the network.

6. The system of claim 1, wherein the network is a packet-switched network.

7. A system for improving audio quality of conference calls placed over a network using lossy audio compression, comprising:
    means for receiving a plurality of compressed audio channels, each of the audio channels being compressed using a lossy compression algorithm;
    means for performing a decompression/compression transformation on the compressed audio channels to produce a compressed summation stream;
    means for selectively enabling one of the compressed audio channels to bypass the decompression/compression transformation means;
    means for transferring the dominant channel and the compressed summation stream over the network; and
    means for receiving the dominant channel and compressed summation stream transferred over the network,
    wherein the receiving means includes means permitting a user to adjust the volume of the dominant channel and the summation stream relative to one another.

8. A system for improving audio quality of conference calls placed over a network using lossy audio compression, comprising:
    means for receiving a plurality of compressed audio channels, each of the audio channels being compressed using a lossy compression algorithm;
    means for performing a decompression/compression transformation on the compressed audio channels to produce a compressed summation stream; and
    means for selectively enabling one of the compressed audio channels to bypass the decompression/compression transformation means,
    wherein the means for selecting includes means for manually pre-selecting the dominant channel.

9. A method of improving audio quality of conference calls placed over a network, comprising:
    receiving a plurality of compressed audio channels, each of the audio channels being compressed using a lossy compression algorithm;
    decompressing the compressed audio channels to produce a plurality of decompressed audio channels;
    summing the decompressed audio channels to produce a summation stream;
    selecting a dominant channel from the compressed audio channels by comparing a plurality of correlation values derived from the decompressed audio channels to determine the dominant channel;
    compressing the summation stream; and
    combining the dominant channel and the compressed summation stream for transmission over the network.

10. The method of claim 9, further comprising:
    suppressing transfer of the dominant channel based on traffic flow across the network.

11. The method of claim 10, further comprising:
    configuring a threshold level of traffic flow across the network.

12. A method of improving audio quality of conference calls placed over a network, comprising:
    receiving a plurality of compressed audio channels, each of the audio channels being compressed using a lossy compression algorithm;
    decompressing the compressed audio channels to produce a plurality of decompressed audio channels;
    summing the decompressed audio channels to produce a summation stream;
    selecting a dominant channel from the compressed audio channels; compressing the summation stream;
    combining the dominant channel and the compressed summation stream for transmission over the network;
    wherein said selecting comprises manually pre-selecting the dominant channel.

13. A system for improving audio quality of conference calls placed over a network, comprising:
    a conference server including an input interface configured to receive a plurality of compressed audio channels, each of the audio channels being compressed using a lossy compression algorithm;

a decompressor configured to decompress the compressed audio channels to produce a plurality of decompressed audio channels;

an adder configured to sum the decompressed audio channels to produce a summation stream;

a correlation unit configured to select a dominant channel from the compressed audio channels;

a compressor configured to compress the summation stream; and an output interface configured transferring the dominant channel and the compressed summation stream over the network;

wherein the correlation unit includes a comparator configured to compare a plurality of correlation values derived from the decompressed audio channels to determine the dominant channel.

14. The system of claim 13, further comprising:

a receiver, communicating with the server via the network, for receiving the dominant channel and the compressed summation stream.

15. The system of claim 14, wherein the receiver includes a decompressor for decompressing the dominant channel and the compressed summation stream.

16. The system of claim 13, wherein the compressed audio channels are packetized.

* * * * *